Oct. 13, 1936.  G. B. GALLASCH  2,057,187
MICROSCOPE
Filed Aug. 31, 1932   2 Sheets-Sheet 2

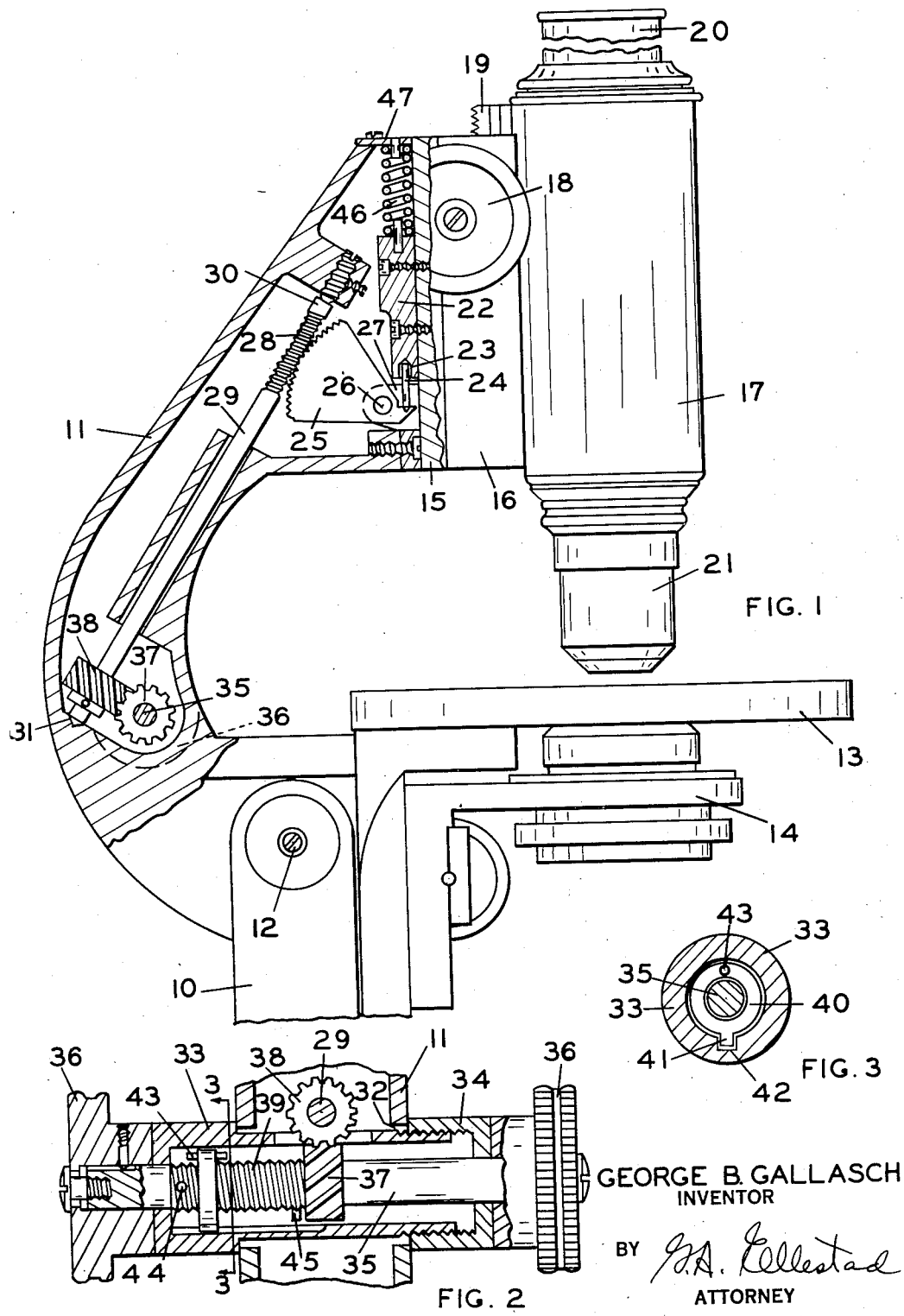

GEORGE B. GALLASCH
INVENTOR

BY *J. A. Ellestad*
ATTORNEY

Patented Oct. 13, 1936

2,057,187

UNITED STATES PATENT OFFICE 2,057,187

MICROSCOPE

George B. Gallasch, Rochester, N. Y., assignor to Bausch & Lomb Optical Company, Rochester, N. Y., a corporation of New York Application August 31, 1932, Serial No. 631,211

11 Claims. (Cl. 88—39)

This invention relates to microscopes and more particularly it has reference to the fine-adjustment mechanism which is used for effecting relatively small movements of the lens tube for focusing purposes.

One of the objects of my invention is to provide an improved fine adjustment device for a microscope. Another object is to provide a microscope with a fine adjustment mechanism which can be actuated with the operator's hand resting on the table. A further object is to provide, near the top of a microscope, a fine adjustment mechanism having a rotary member and means for actuating said member from a point near the lower part of the microscope stand. A still further object is to provide a microscope having fine adjustment mechanism near the top of the stand, a rotary member mounted on the lower part of the stand, stop means for said member and shaft means for operatively connecting said member and mechanism. These and other objects and advantages reside in certain novel features of construction, arrangement and combination of parts as will hereinafter be more fully described and pointed out in the appended claims.

Referring to the drawings:

Fig. 1 is a side view of a microscope, with parts in section, showing the application of my invention.

Fig. 2 is a sectional view of the fine adjustment actuating means.

Fig. 3 is a sectional view on line 3—3 of Fig. 2.

Figure 5:
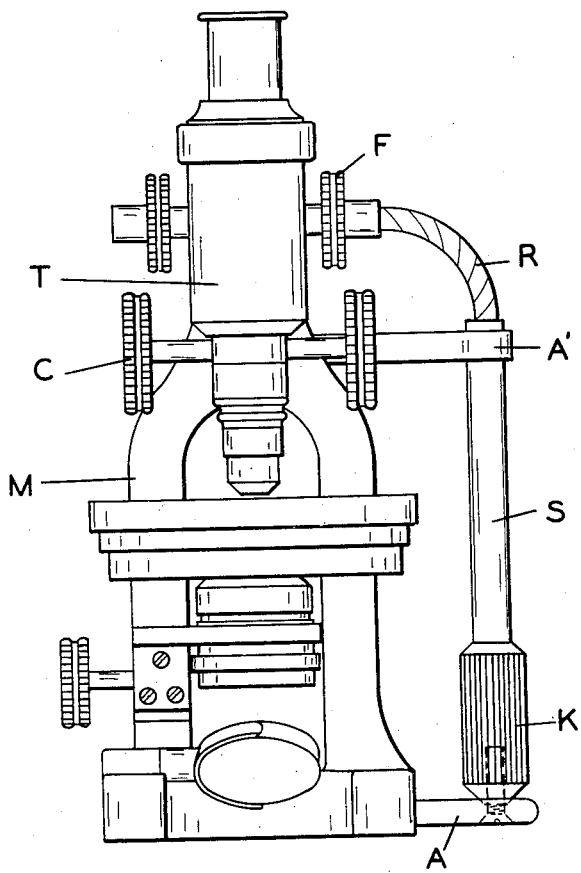
Fig. 5 is a front elevation of a microscope showing a modification of my invention.
Figure 4:
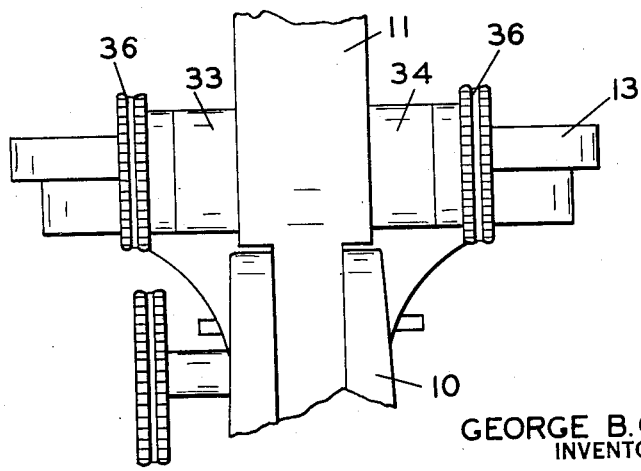
Fig. 4 is a fragmentary rear elevation of the microscope showing the fine adjustment actuating knobs.

One embodiment of my invention is illustrated in Figs. 1—4 wherein 10 indicates a base portion of the stand of a microscope on which the arm 11 is pivotally mounted at 12. The stage 13 and the usual sub-stage equipment 14 are carried by the arm 11. Slidably mounted on the forward upper end of arm 11 is the slide 15 which carries the block 16 on which the body tube 17 is movably mounted and adapted to be focused by the coarse adjustment knob 18 actuating a pinion, not shown, which cooperates with rack 19. The body tube 17 carries the usual eye piece 20 and objective 21.

Fixedly secured to slide 15 is the block 22 having on its under side a recess 23 which receives the upper end of a thrust pin 24 which rests on the gear segment 25 which is pivotally mounted at 26 on a boss 27 carried by arm 11. As shown on Fig. 1, the arm 11 is hollow so that the gear segment 25 projects into the arm and cooperates with a screw 28 carried by the downwardly extending shaft 29 which is rotatably mounted as at 30 and 31. The lower part on arm 11 has an opening 32 in which is mounted a bushing 33 which is secured by threaded collar 34. Rotatably mounted in the bushing and collar is a stub shaft 35 having the two actuating knobs 36 fixed to opposite ends.

Fixedly carried by shaft 35 is a gear 37 which meshes with a gear 38 fixed to the lower end of shaft 29 so that rotary motion of shaft 35 is transmitted to shaft 29. The shaft 35 has a threaded portion 39 on which is mounted a nut 40 having a projection 41 which is positioned in a slot 42 on the inner wall of bushing 33. Mounted in the top of nut 40 is a pin 43 which contacts with pins 44 and 45 carried by shaft 35 as the nut travels back and forth. Mounted on the upper side of block 22 is the spring 46 which contacts with the plate 47 secured to arm 11 so that the block 22 is urged downwardly.

From the foregoing it will be apparent that fine focusing adjustments can be effected by turning knob 36. The rotary motion of shaft 35 is transmitted to the screw 28 so that the gear segment 25 moves on its pivot and effects a sliding motion of the slide 15. As the knobs 36 are turned the nut 40 travels back and forth until the pin 43 contacts with either pin 44 or pin 45 and thereby limits the movement of shaft 35 and prevents the disengagement of screw 28 and gear segment 25.

In Fig. 5 I have shown a modification of my device as applied to a microscope M having the lens tube T which may be focussed by turning the coarse adjustment knob C and the fine adjustment knob F. The coarse adjustment mechanism may comprise the usual rack and pinion arrangement while the fine adjustment mechanism may be of any type having a rotatable member such as that shown in U. S. Patent No. 1,123,583 issued to W. L. Patterson on January 5, 1915. Secured to the upper and lower parts of the stand of microscope M are the two arms A and A' on which is rotatably mounted an upright shaft S having a knurled portion K. A flexible shaft member R connects the shaft S and the fine adjustment knob F so that rotary motion of the shaft S is transmitted to the knob F.

It will thus be apparent that I am able to attain the objects of my invention and provide a microscope having a fine adjustment that can be operated with the hand resting on the table.

Such a feature renders the instrument less tiring in use, especially to research workers who use a miscroscope for long periods at a time. In the type shown in Figs. 1–4, the remote control for the fine adjustment is concealed within the arm so as to afford a compact, neat appearing instrument. In this type, the motion reducing mechanism has been kept at the top of the arm in close proximity to the slide which carries the body tube, as is customary in a large number of standard microscopes. This permits the motion reducing mechanism to transmit directly to the body tube slide the small focusing movements. The modification shown in Fig. 5 can be readily adapted to operate the rotary members of fine adjustment mechanisms on existing types of microscopes now on the market. Various modifications can obviously be made without departing from the spirit of my invention.

I claim:

1. In a microscope the combination of a support, a lens tube movably mounted on said support, motion reducing mechanism for moving said tube, said mechanism being mounted at the upper part of said support and means for actuating said mechanism, said means comprising an element rotatably mounted on the lower part of said support remote from said mechanism and rotary means for transmitting rotary motion from said element to said mechanism.

2. In a microscope, the combination of a support, a lens tube movably mounted on said support, mechanism at the upper part of said support for moving said tube, said mechanism comprising motion reducing means having a rotatable member, an element rotatably mounted on the lower part of said support remote from said mechanism and rotary means for transmitting rotary motion of said element to said member.

3. In a microscope, the combination of a stand, a lens tube movably mounted on the stand, fine adjustment mechanism comprising a rotary member for moving said tube, said mechanism being carried at the upper part of the stand, an element rotatably mounted on the lower part of said stand remote from said mechanism and rotary means for transmitting rotary motion from said element to said member to operate said mechanism.

4. A microscope comprising a stand, a member movably mounted on said stand, a lens system carried by said member, a stage beneath said system, fine adjustment mechanism for effecting relatively small movements of said member, said mechanism being positioned adjacent to the top of said stand, an element rotatably mounted on said stand adjacent to said stage and means for transmitting rotary motion from said element to said mechanism, said last named means comprising a downwardly extending rotatable shaft.

5. A microscope having in combination an arm, a stage carried by the lower part of the arm, a lens tube movably mounted on said arm above said stage, mechanism carried by the upper part of said arm for moving said tube, said mechanism having a rotatable member, an element rotatably mounted on said arm at a point opposite said stage and rotary means for operatively connecting said element and member to transmit rotary motion of said element to said member.

6. In a microscope, the combination of a stand, a lens tube movably mounted on said stand, mechanism near the top of said stand for moving said tube, said mechanism having rotatable screw means, an element rotatably mounted near the lower part of said stand, a shaft and cooperating gearing for transmitting rotary motion of said element to said screw means.

7. In a microscope, the combination of a support, a lens tube movably mounted on said support, mechanism at the upper part of said support for moving said tube, said mechanism comprising a rotatable member and cooperating means for changing rotary motion to sliding motion, an element rotatably mounted at the lower part of said support, stop means for limiting the motion of said element and means for transmitting the rotary motion of said element to said member.

8. In a microscope, the combination of a hollow arm, a lens tube movably mounted on said arm, mechanism positioned within and near the top of said arm for moving said tube, said mechanism comprising a rotatable screw positioned to cooperate with a pivoted gear segment, a rotatable shaft within said arm, said shaft being operatively connected to said screw, an element rotatably mounted on the lower part of said arm, and means for operatively connecting said shaft and said element.

9. In a microscope, the combination of a hollow arm, a lens tube movably mounted on said arm, mechanism mounted within and at the upper part of said arm for moving said tube, said mechanism comprising a rotatable screw and a cooperating pivotally mounted gear sector, a downwardly extending shaft rotatably mounted within said arm, the upper end of said shaft being connected to said screw, an element rotatably mounted on the lower part of said arm, said element carrying a gear which cooperates with a gear on the lower end of said shaft and means for manipulating said element.

10. In a microscope, the combination of a stand, a lens tube movably mounted upon said stand, mechanism at the top of said stand for moving said tube, said mechanism having a rotatable member, an element rotatably mounted upon the lower part of said stand, and means, including a flexible shaft, for transmitting motion from said element to said member.

11. An attachment for a microscope having a support, a lens tube and a fine adjustment means for focusing the lens tube, comprising a downwardly extending shaft, detachable means for rotatably mounting said shaft on said support, means for connecting said shaft to said fine adjustment means, and means adjacent the lower end of said shaft for rotating said shaft.

GEORGE B. GALLASCH.